(12) United States Patent
Joshi et al.

(10) Patent No.: US 12,043,400 B2
(45) Date of Patent: Jul. 23, 2024

(54) COOLING SYSTEM FOR AIRCRAFT COMPONENTS INCLUDING RAM CHUTE BODY AND RELATIVELY ROTATABLE AIR CONDUIT

(71) Applicant: Toyota Motor Engineering & Manufacturing North America, Inc., Plano, TX (US)

(72) Inventors: Shailesh N. Joshi, Ann Arbor, MI (US); Danny J. Lohan, Northville, MI (US); Hiroshi Ukegawa, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 186 days.

(21) Appl. No.: 17/707,237

(22) Filed: Mar. 29, 2022

(65) Prior Publication Data

US 2023/0312122 A1 Oct. 5, 2023

(51) Int. Cl.
*B64D 33/08* (2006.01)
*B64C 29/00* (2006.01)
*B64D 29/02* (2006.01)

(52) U.S. Cl.
CPC ............. *B64D 33/08* (2013.01); *B64D 29/02* (2013.01); *B64C 29/0008* (2013.01)

(58) Field of Classification Search
CPC ...... B64D 29/02; B64D 33/08; B64C 29/0008
USPC .......................................................... 244/57
See application file for complete search history.

(56) References Cited

U.S. PATENT DOCUMENTS

| | | | |
|---|---|---|---|
| 4,250,703 A * | 2/1981 | Norris | B64D 33/02 55/306 |
| 4,275,857 A * | 6/1981 | Bergsten | F02C 7/04 137/15.1 |
| 4,539,944 A | 9/1985 | Garcea et al. | |
| 4,674,704 A | 6/1987 | Altoz et al. | |
| 5,284,012 A * | 2/1994 | Laborie | F02C 7/12 60/39.08 |
| 7,325,772 B1 | 2/2008 | Hanewinkel, III et al. | |
| 8,973,867 B2 * | 3/2015 | Eichholz | B64D 33/02 454/71 |
| 9,411,380 B2 | 8/2016 | Farahani et al. | |
| 9,714,090 B2 | 7/2017 | Frolov et al. | |
| 10,041,689 B2 | 8/2018 | Kymissis et al. | |
| 2002/0056790 A1 | 5/2002 | Trimmer | |
| 2007/0120009 A1 | 5/2007 | Kelnhofer | |
| 2008/0178526 A1 | 7/2008 | Browne et al. | |

(Continued)

*Primary Examiner* — Brady W Frazier
(74) *Attorney, Agent, or Firm* — Christopher G. Darrow; Darrow Mustafa PC (57) ABSTRACT

A ram chute assembly is provided for directing a flow of cooling air into a hollow wing structure of an aircraft. The ram chute assembly includes a ram chute body defining an interior passage, and an air inlet enabling an airflow from an exterior of the ram chute body into the interior passage. The assembly is structured to be attachable to an exterior of an engine nacelle so as to receive propeller wash air through the air inlet into the interior passage when a propeller of the engine nacelle is rotating. The ram chute assembly is also structured to discharge the propeller wash air in a direction toward an air intake opening formed in an upper surface of a hollow wing structure on which the engine nacelle is mounted.

9 Claims, 5 Drawing Sheets

(56) References Cited

U.S. PATENT DOCUMENTS

| | | | |
|---|---|---|---|
| 2014/0116654 A1* | 5/2014 | McGlaun | F16H 57/0417 |
| | | | 165/104.34 |
| 2018/0274563 A1* | 9/2018 | Elving | B64C 13/36 |
| 2018/0334251 A1 | 11/2018 | Karem et al. | |
| 2019/0033932 A1* | 1/2019 | Ku | B64U 50/19 |
| 2019/0270517 A1 | 9/2019 | Morgan | |
| 2020/0070994 A1* | 3/2020 | Rosado | B01F 25/10 |
| 2021/0155350 A1* | 5/2021 | Kwon | H01M 10/613 |
| 2021/0261268 A1* | 8/2021 | Tamada | B64D 37/04 |
| 2023/0174247 A1* | 6/2023 | Ahyow | B64C 39/08 |
| | | | 244/57 |
| 2023/0182916 A1* | 6/2023 | Resnick | B60L 50/10 |
| | | | 244/54 |
| 2023/0192311 A1* | 6/2023 | Asanuma | B64C 29/0025 |
| | | | 244/57 |

* cited by examiner

COOLING SYSTEM FOR AIRCRAFT COMPONENTS INCLUDING RAM CHUTE BODY AND RELATIVELY ROTATABLE AIR CONDUIT

TECHNICAL FIELD

The embodiments disclosed herein relate to cooling systems for vehicle components and, more particularly, to a system designed to focus ram air from a propeller wash into a hollow wing structure of an aircraft, for cooling aircraft components mounted inside the wing.

BACKGROUND

Electrical vertical take-off and landing (eVTOL) vehicles are electric vehicles that transport passengers by flying. Similar to helicopters, they take-off and land vertically. It is expected that gas-powered VTOLs and eVTOLs will become popular methods of transportation in the future. To conserve space and reduce weight in such vehicles, the wings of the aircraft may be hollow and structured to accommodate batteries for powering the aircraft and power electronics for controlling aircraft components and operations. However, the batteries and power electronics generate significant heat, particularly during take-off, landing and during times of acceleration. Heat from these heat-generating elements must be removed to keep the components operating below their maximum operating temperatures. Various methods of cooling heat-generating elements may include passing gases or liquids over surfaces of these components to remove heat therefrom. The use of a liquid cooling medium adds undesirable weight to the aircraft and introduces the problem of potential leakage of the cooling medium. When using gaseous cooling media such as ambient air, it is desirable to ensure a flow of cooling air into the wing interior when the aircraft is not moving. It is also desirable to direct the flow of cooling air over as many external surfaces of the heat-generating element(s) as possible, to ensure efficient cooling and avoid localized hotspots in the components.

SUMMARY

In one aspect of the embodiments described herein, a ram chute assembly is provided for directing a flow of cooling air into a hollow wing structure of an aircraft. The ram chute assembly includes a ram chute body defining an interior passage, and an air inlet enabling an airflow from an exterior of the ram chute body into the interior passage. The assembly is structured to be attachable to an exterior of an engine nacelle so as to receive propeller wash air through the air inlet into the interior passage when a propeller of the engine nacelle is rotating. The ram chute assembly is also structured to discharge the propeller wash air in a direction toward an air intake opening formed in an upper surface of a hollow wing structure on which the engine nacelle is mounted.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A ram chute assembly is provided for directing a flow of cooling air into a hollow wing structure of an aircraft. The ram chute assembly includes a ram chute body defining an interior passage, and an air inlet enabling an airflow from an exterior of the ram chute body into the interior passage. The assembly is structured to be attachable to an exterior of an engine nacelle so as to receive propeller wash air through the air inlet into the interior passage when a propeller of the engine nacelle is rotating. The ram chute assembly is also structured to discharge the propeller wash air in a direction toward an air intake opening formed in an upper surface of a hollow wing structure on which the engine nacelle is mounted. The ram chute assembly may discharge air toward the air intake to provide a flow of cooling air to the hollow wing interior both when the engine nacelle is in a raised orientation and in a lowered orientation.

Figure 1:
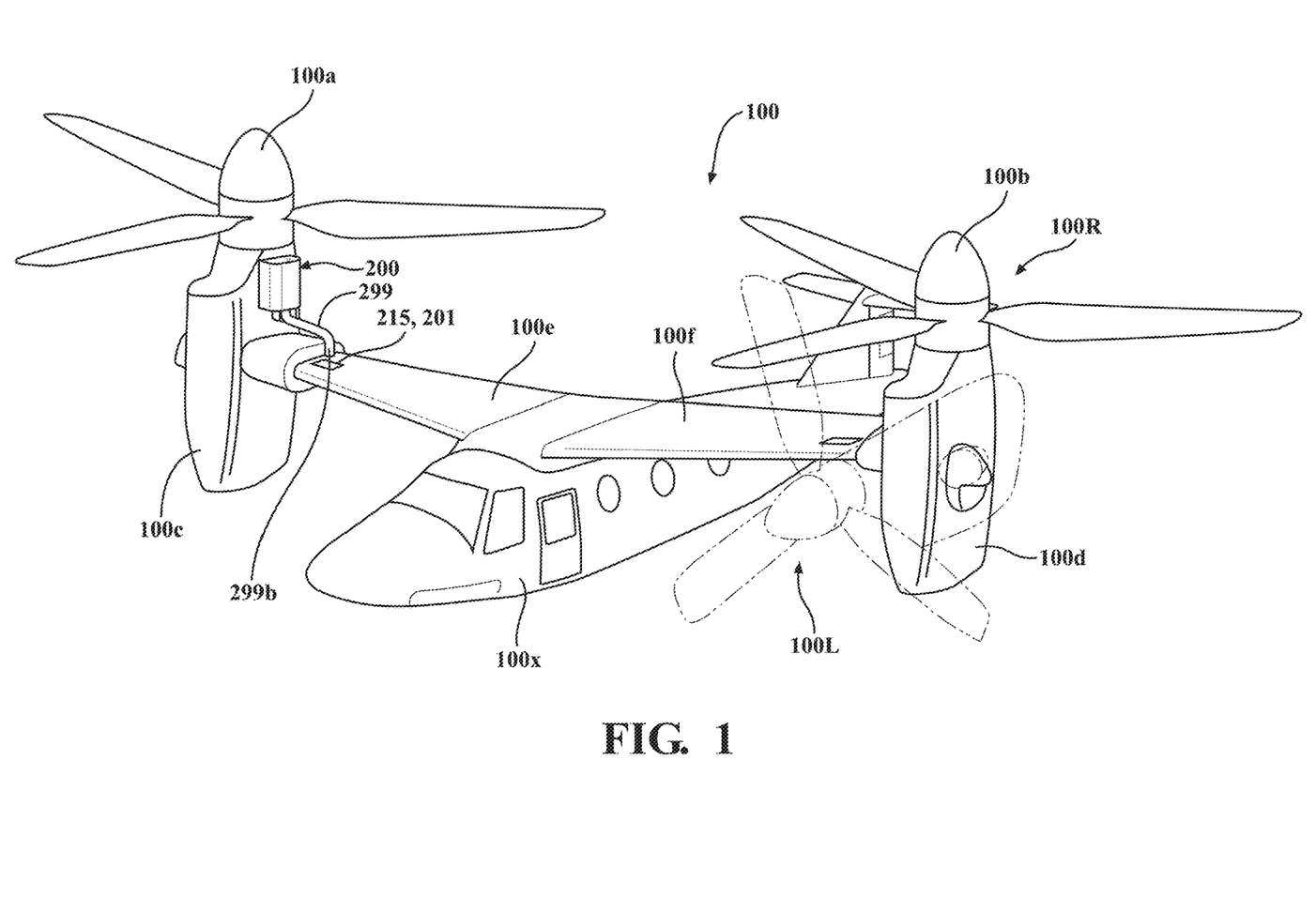
FIG. 1 is a schematic perspective view of a VTOL (vertical take-off and landing) aircraft incorporating a ram chute assembly in accordance with embodiments described herein.

Referring to FIG. 1, an example of a VTOL (vertical take-off and landing) aircraft is shown. The aircraft 100 may be piloted by a human pilot or the aircraft may be an autonomously-operable drone or UAV (unmanned aerial vehicle). In some implementations, the aircraft 100 may be any form of motorized transport that benefits from the functionality discussed herein. Some of the possible elements of the aircraft 100 are shown in the drawings and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In the drawings, the aircraft 100 is configured for VTOL operations, using a tilt-rotor design (i.e., a "tiltrotor"). As is known in the pertinent art, a tiltrotor is an aircraft which generates lift and forward propulsion by using one or more powered propellers or rotors 100a, 100b mounted on rotating shafts incorporated into respective engine nacelles 100c, 100d which may be mounted at the ends of respective fixed wings 100e, 100f extending from a fuselage 100x of the aircraft 100. Wings 100e, 100f may have conventional airfoil shapes for providing lift in a conventional manner responsive to forward motion of the aircraft and the resulting flow of air along the wing exterior surfaces. The tiltrotor aircraft 100 may combine the VTOL capability of a helicopter with the speed and range of a conventional fixed-wing aircraft. For takeoffs, hovering over a fixed position, and landings, each of the rotors 100a, 100b may be rotated to a "raised" orientation (shown as orientation 100R in FIG. 1) so that the plane of rotor rotation is horizontal. In this configuration, lift may be generated in the same manner as with a normal helicopter rotor. As the aircraft gains forward speed, the rotors 100a, 100b may be progressively tilted forward to a lowered orientation (shown as orientation 100L in FIG. 1), with the plane of rotor rotation becoming vertical. In this mode the rotors 100a, 100b may provide forward thrust as conventional propellers, with the airfoils of the fixed wings 100e, 100f providing the lift via the forward motion of the entire aircraft 100.

Figure 2:
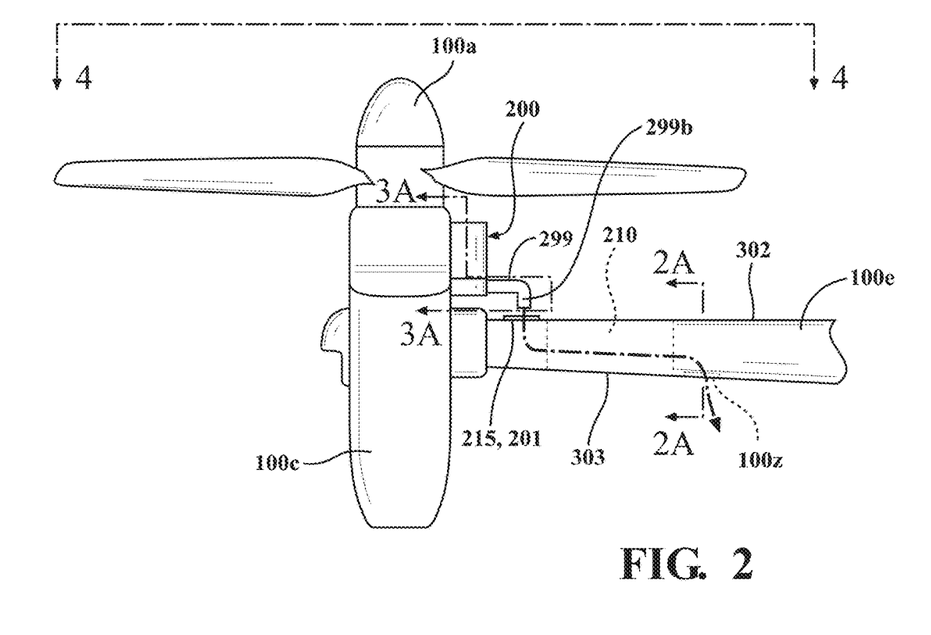
FIG. 2 is a schematic front view of a portion of a wing of the aircraft shown in FIG. 1, showing an engine nacelle mounted on the wing and residing in a raised orientation.
Figure 2A:
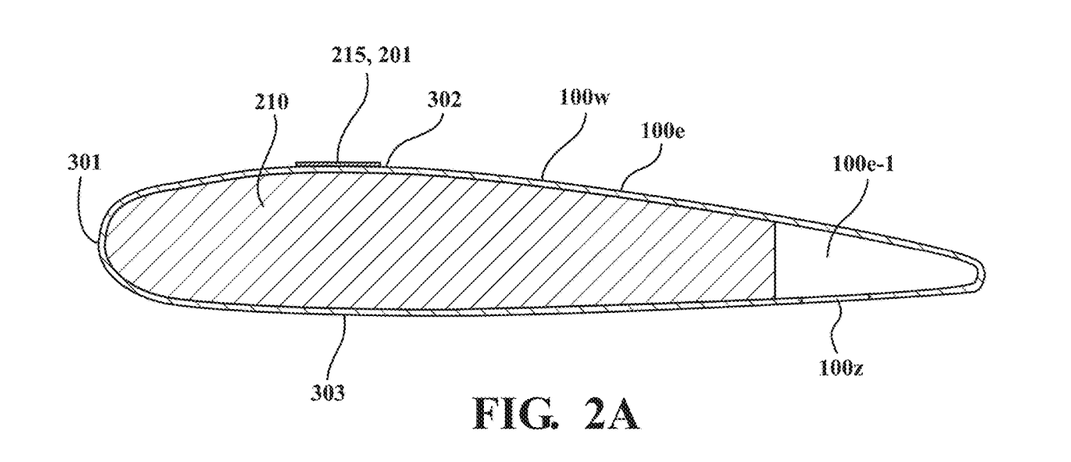
FIG. 2A is a schematic cross-sectional view of the aircraft wing shown in FIG. 2.

The following descriptions of wing 100e and any elements attached to or incorporated into wing 100e may also apply to wing 100f. FIG. 2 is a schematic front view of a portion of the wing 100e, showing an engine nacelle 100c mounted on the wing 100e and residing in a raised orientation. FIG. 2A is a schematic cross-sectional view of the wing 100e shown in FIG. 2. The wing 100e may have a leading edge 301, an upper or top surface 302 extending from the leading edge 301, and a lower or bottom surface 303 extending from the leading edge 301 opposite the upper surface 302. At least a portion of the wing 100e may be hollow and define an interior 100e-1 structured for mounting therein various elements of the aircraft 100. The wing 100e may have a thermally conductive outer wall 100w structured to facilitate rapid and efficient transfer of heat from the wing interior 100e-1 to an exterior of the wing. To this end, the wing outer wall 100w may be formed from aluminum or any other material (or combination of materials) having a relatively high thermal conductivity. In some arrangements, a heat-generating element 210 such as a battery or a power electronics module may be mounted in the wing interior 100e-1.

As seen in FIGS. 1-2A, one or more cooling air intake opening(s) 215 may be formed in the wing upper surface 302. In addition, one or more air outlet(s) 100z may be formed in the wing lower surface 303. The intake opening(s) 215 and outlet(s) 100z may be positioned so that air entering the intake opening(s) 215 is drawn over one or more outer surfaces of the heat-generating element 210 and toward the outlet(s) 100z, to facilitate cooling of the heat-generating element 210. The heat-generating element 210 may be positioned in alignment with one or more of cooling air intake opening(s) 215 and outlet(s) 100z formed in the wing 100e, so that cooling air entering the air intake opening(s) 215 and passing over the heat-generating element 210 may be directed out of the wing interior after cooling the heat-generating element. The air intake opening(s) 215 and outlet(s) 100z may have any desired dimensions to enable a sufficient flowrate of air according to estimated cooling needs, structural considerations of the wing, and other factors. Each air intake opening 215 may be provided with an associated louvre 201 to enable the air intake opening 215 to be closed. In some arrangements, the louvre may be rotatable so as to extend away from the wing upper surface 302, to guide or deflect a portion of the air flowing over the wing upper surface 302 into the associated air intake opening 215.

In one or more particular arrangements, the hollow interior 100e-1 of the wing 100e may have a heat-generating element 210 in the form of a battery mounted therein for powering the various components and systems of the aircraft 100. For example, the battery 210 may be electrically coupled to one or more of engine nacelle(s) 100c, 100d and may be configured for powering the aircraft engines for operations such as idling, takeoff, hovering, forward flight, and landing. As seen in FIGS. 2 and 2A, in some arrangements, portions of the battery 210 may be shaped to conform to (and make intimate thermal contact with) interior surfaces of the wing 100e, to facilitate heat transfer from the battery 210 and for efficient utilization of the wing interior space. FIGS. 2 and 2A show the outer surfaces of battery 210 conforming to portions of the interior 100e-1 of the wing 100e opposite the wing leading edge 301, the wing upper surface 302, and the wing lower surface 303.

Certain operations of the aircraft 100 (such as liftoff and forward acceleration) may require relatively greater amounts of power from the wing-mounted aircraft batteries 210. The increased power generation may produce correspondingly higher levels of heat in the batteries. If not removed from the batteries and wing interior, excessive heat may cause damage to the batteries and/or to other components (such as vehicle electronics) which may also be mounted in the wing.

Figure 3A:
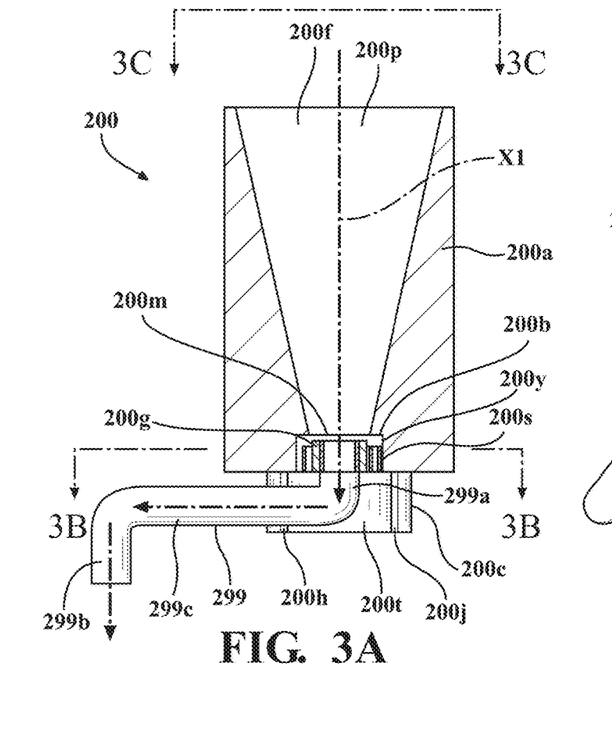
FIG. 3A is a schematic cross-sectional side view of a ram chute assembly in accordance with an embodiment described herein.
Figure 3B:
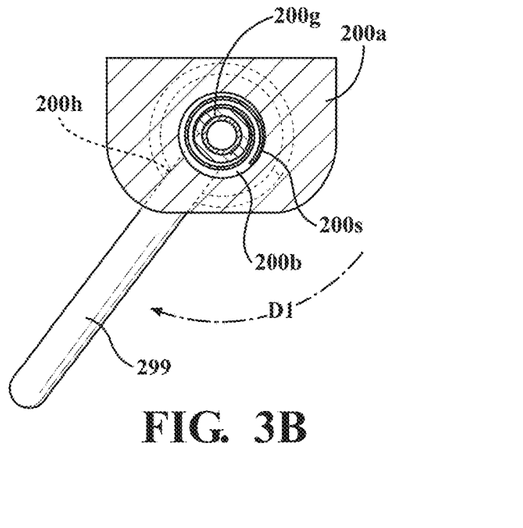
FIG. 3B is a schematic cross-sectional plan view of a portion of the ram chute assembly shown in FIG. 3A.
Figure 3C:
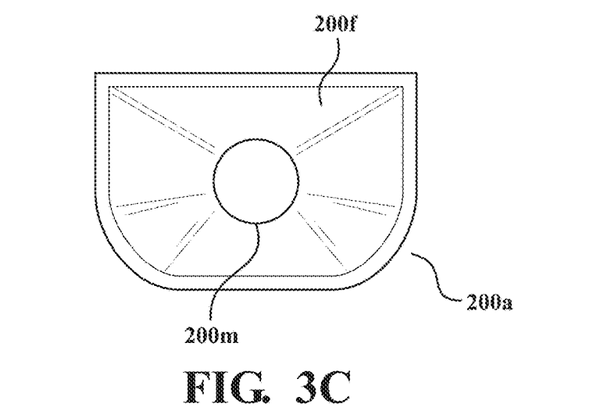
FIG. 3C is a schematic plan view of a ram chute body of the ram chute assembly shown in FIG. 3A.

Referring to the drawings, to aid in cooling the batteries and the wing interior spaces, a novel ram chute assembly (generally designated 200) may be provided. FIG. 3A is a schematic cross-sectional side view of a ram chute assembly in accordance with an embodiment described herein. FIG. 3B is a schematic cross-sectional plan view of a portion of the ram chute assembly shown in FIG. 3A. FIG. 3C is a schematic plan view of a ram chute body of the ram chute assembly shown in FIG. 3A. Referring in particular to FIGS. 2 and 3A-3C, the ram chute assembly 200 may include a ram chute body 200a defining an interior passage 200f and an air inlet 200p enabling airflow from an exterior of the ram chute body 200a into the interior passage 200f. The ram chute body 200a may be structured to enable attachment of the ram chute body and the ram chute assembly 200 to an exterior of an engine nacelle (such as nacelle 100c) as shown in FIG. 2. In some arrangements, the shape of any particular ram chute body may be tailored to conform to an exterior shape of a portion of an associated engine nacelle. The air inlet 200p may be structured and positioned to receive propeller wash air from propeller 100a when the ram chute assembly 200 is mounted on the nacelle 100c and the propeller 100a is rotating.

As seen in FIGS. 3A and 3C, the ram chute body interior passage 200f may be shaped as a funnel, gradually narrowing in a direction leading from the air inlet 200p toward an end opening 200m of the interior passage 200f adjacent the bottom cavity 200b (described below). The funnel shape of the interior passage 200f may be structured to accelerate and pressurize ram air flowing into the interior via the air inlet 200p as the air flows toward the bottom cavity 200b.

A bottom cavity 200b of the ram chute body 200a may be formed outside the interior passage 200f. In one or more arrangements, the bottom cavity 200b may be formed along a linear axis X1 extending through the body interior passage. The bottom cavity 200b may be in fluid communication with the interior passage 200f to enable an airflow to exit the passage 200f and enter an air conduit 299 (described below) partially positioned in the bottom cavity. The bottom cavity 200b may be configured for mounting a portion of the air conduit 299 therein, as described in greater detail below.

The ram chute assembly 200 may include an air conduit 299 in fluid communication with the ram chute body interior passage 200f and structured to extend from the ram chute body 200a in a direction toward an air intake opening 215 formed in an upper surface of wing 100e. The air conduit 299 may be structured to convey ram air from the ram chute body interior passage 200f to the air intake opening 215. The air conduit 299 may be in the form of a rigid, hollow tube shaped as shown in the drawings to extend from the ram chute body 200a to a location above the air intake opening 215 when the engine nacelle 100c is in the raised orientation. The air conduit 299 may be operably connected to the ram chute body 200a so as to be rotatable with respect to the ram chute body.

The air conduit 299 may have a chute portion 299a, a discharge portion 299b, and a body 299c connecting the chute portion 299a and the discharge portion 299b. The chute portion 299a may be rotatably secured in the ram chute body bottom cavity 200b so as to be in fluid communication with the ram chute body interior passage 200f, thereby enabling the air conduit 299 to receive ram air from the ram chute body interior passage 200f. The discharge portion 299b may be structured to direct air exiting the discharge portion toward the wing air intake opening 215 when the air conduit 299 is rotationally biased so as to suspend the discharge portion 299b over the air intake opening, as described herein.

An annular collar 200c may be attached to an end of the ram chute body 200a below the bottom cavity 200b. The collar 200c may have an opening 200t formed therein through which the air conduit may extend. The opening 200t may be bounded by arcuately spaced-apart first and second edges 200h, 200j. In one or more arrangements, the air conduit chute portion 299a may be attached to a grommet 200g using an interference fit, an adhesive, or by any other suitable method so that the chute portion 299a and the grommet 200g rotate together. The combination of the grommet 200g and air conduit 299 is structured to be rotatable with respect to the ram chute body 200a.

A suitable spring member 200s (for example, a spiral-wound spring member) may operably connect the grommet 200g to an inner wall 200y of the bottom cavity 200b. A portion of the spring member 200s may be pre-deflected so as to exert a reaction force tending to rotate the air conduit 299 in a direction D1 (FIG. 3B) with respect to the ram chute body 200a. As seen in FIGS. 1, 3A, 3B, 4, and 6, this reaction force acts to rotationally bias the air conduit body 299c against collar opening first edge 200h in a first rotational orientation when the engine nacelle 100c is in the raised orientation. The collar 200c may be structured, rotated, and secured to the ram chute body 200a so that the collar opening first edge 200h is positioned to serve as a hard stop to maintain the air conduit 299 in the first rotational orientation where the air conduit discharge portion 299b resides above the wing air intake opening 215 when the engine nacelle 100c is in the raised orientation. Thus, when the engine nacelle 100c is raised and the air conduit 299 is biased into its first rotational orientation, the ram chute body interior passage 200f may receive ram air from the propeller wash and channel the ram air into the air conduit 299. The ram air may then proceed along the air conduit 299, exiting the air conduit at discharge portion 299b and flowing into the wing air intake opening 215. This may provide a relatively concentrated, high-speed flow of cooling air to the wing interior 100e-1 during aircraft liftoff and when the engine in the nacelle 100c is idling.

Figure 4:
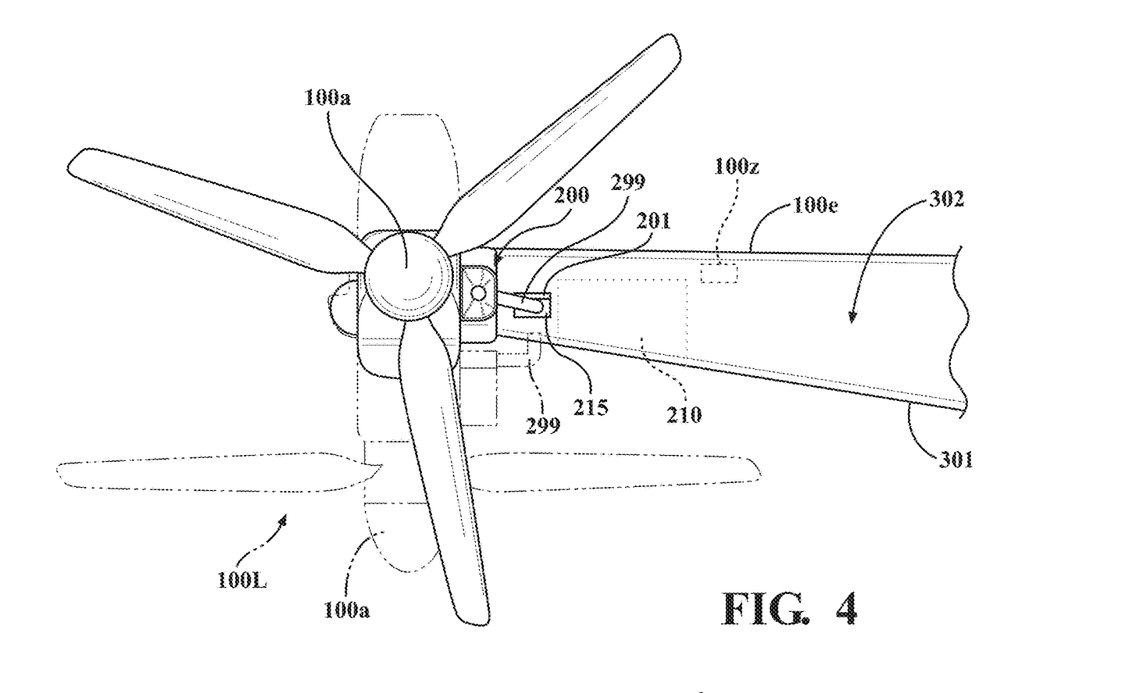
FIG. 4 is a schematic plan view of the portion of the wing shown in FIG. 2, showing the engine nacelle residing in a raised orientation.
Figure 5:
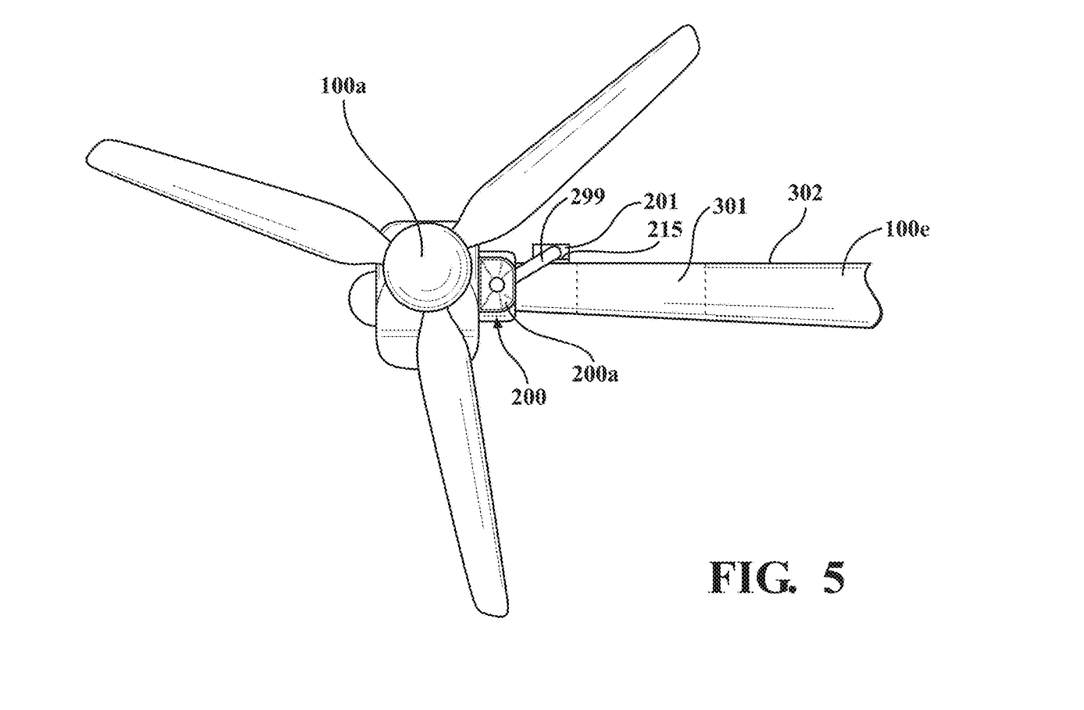
FIG. 5 is a schematic front view of the portion of the wing shown in FIG. 2, showing the engine nacelle residing in a lowered orientation.

Referring now to FIGS. 1, 4, 5, and 6, during operation of the aircraft 100, the engine nacelle 100c may be rotated from the raised orientation 100R to the lowered orientation 100L. FIG. 4 is a schematic plan view of a portion of the wing 100e, showing the engine nacelle 100c residing in a raised orientation. FIG. 5 is a schematic front view of a portion of the wing 100e, showing the engine nacelle 100c residing in a lowered orientation. The ram chute body 200a may be structured to be connectible to the engine nacelle 100c, and the air conduit 299 may be structured and operably connected to the ram chute body 200a, so that the discharge portion 299b of the air conduit 299 contacts a bearing surface during movement of the engine nacelle 100c from the raised orientation to the lowered orientation. In addition, the contact between the air conduit 299 and the bearing surface during this rotational movement of the engine nacelle 100c produces a rotation of the air conduit 299 from the first rotational orientation to a second rotational orientation. Thus, the air conduit 299 is in the second rotational orientation when the engine nacelle 100c is in the lowered orientation. For example, as the engine nacelle 100c rotates toward the lowered orientation, the air conduit discharge portion 299b may contact a bearing surface formed by a portion of the wing 100e or a feature attached to the wing. In one or more arrangements, the bearing surface may be a leading edge 301 of the wing 100e.

Figure 6:
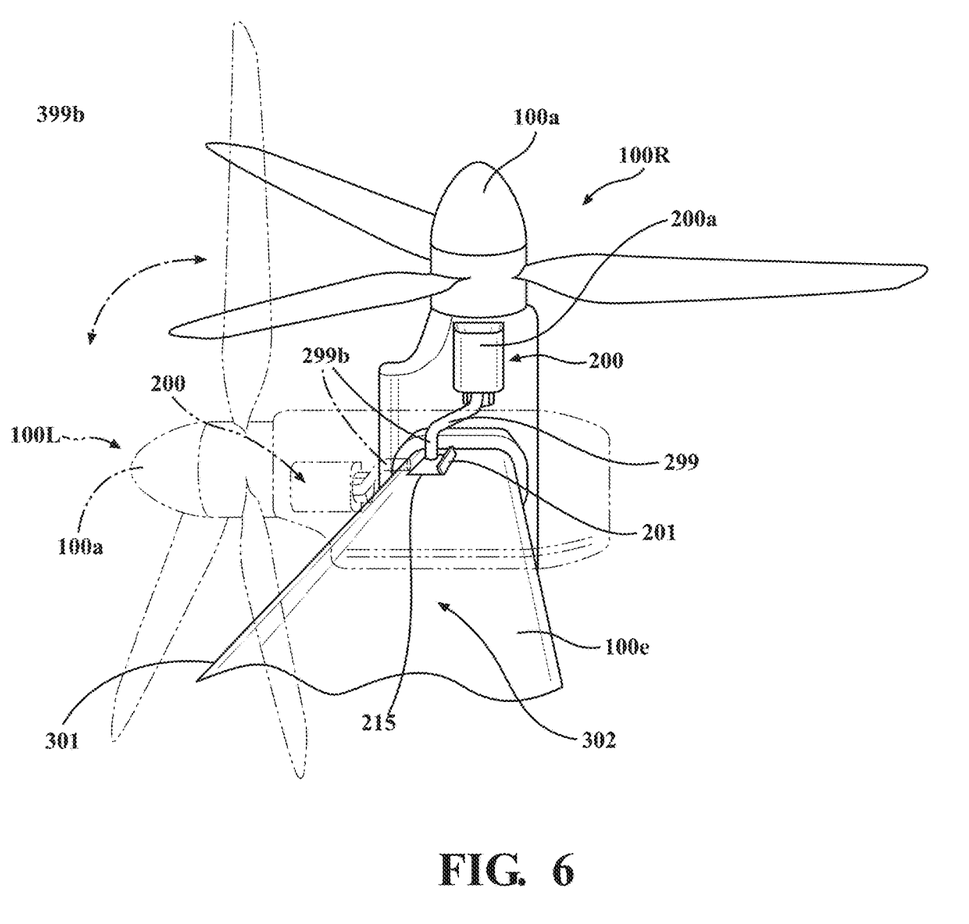
FIG. 6 is a schematic perspective view of the wing shown in FIG. 2, showing the air conduit in its first orientation and second orientation.

FIG. 6 is a schematic perspective view of the wing 100e showing the air conduit 299 in its first orientation (solid lines) and second orientation (phantom lines). As the engine nacelle 100c continues to rotate downwardly, contact with the wing leading edge 301 may force the air conduit 299 to rotate in a direction away from the collar edge 200h and against the biasing force exerted by the spring member 200s. When the engine nacelle 100c reaches the lowered orientation, at least a portion of the air conduit discharge portion 299b may reside on the wing upper surface 302 such that the opening of the discharge portion 299b faces toward the wing air intake opening 215. Thus, in this second rotational orientation of the air conduit 299, the air conduit may discharge propeller wash air along the wing upper surface 302 in a direction toward the air intake opening 215, where the open louvre may deflect the air into the opening 215. This arrangement may provide a relatively concentrated, high-speed flow of cooling air to the wing interior 100e-1 during forward movement of the aircraft.

When the engine nacelle is again raised, the force exerted by spring member 200s may again bias the air conduit into contact with the collar edge 200h so that air may be directed from the ram chute body into the opening 215 from above the opening.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A ram chute assembly structured to be attachable to an exterior of a rotatable engine nacelle, the assembly comprising:
    a ram chute body defining an interior passage, and an air inlet enabling an airflow from an exterior of the ram chute body into the interior passage, and;
    a tube operably connected to the ram chute body so as to be rotatable with respect to the ram chute body, the tube defining an air conduit in fluid communication with the ram chute body interior passage,
    wherein the tube is structured to rotate to a first rotational orientation responsive to rotation of the engine nacelle to a raised orientation, and wherein the tube is structured to rotate to a second rotational orientation different from the first rotational orientation responsive to rotation of the engine nacelle to a lowered orientation.

2. The ram chute assembly of claim 1, structured so as to receive propeller wash air through the air inlet into the interior passage when a propeller of the engine nacelle is rotating, the assembly also being structured to discharge the propeller wash air in a direction toward an air intake opening formed in an upper surface of a wing on which the engine nacelle is mounted.

3. The ram chute assembly of claim 2, wherein the ram chute assembly is structured to discharge the propeller wash air in a direction toward the air intake opening when the tube is in the first rotational orientation and when the air conduit is in the second rotational orientation.

4. The ram chute assembly of claim 1, further comprising:
    a collar attached to the ram chute body, the collar defining an opening therein, the opening having an edge,
    wherein the tube includes a chute portion in fluid communication with the ram chute body interior passage and structured for receiving therein propeller wash air from the ram chute body interior passage; and
    a spring member operably connected to the tube and configured to rotationally bias the tube against the collar opening edge when the engine nacelle is in the raised orientation.

5. The ram chute assembly of claim 2, wherein the tube includes a discharge portion structured to discharge the propeller wash air from the tube, and wherein the discharge portion is structured to discharge the propeller wash air in the direction toward the wing air intake opening when the tube is rotationally biased against the collar opening edge.

6. The ram chute assembly of claim 2, wherein the ram chute body is structured to be operably connectible to the engine nacelle and the tube is structured and operably connected to the ram chute body so that the tube contacts a bearing surface during movement of the engine nacelle from the raised orientation to the lowered orientation, and wherein contact between the tube and the bearing surface during the movement of the engine nacelle produces rotation of the tube from the first rotational orientation when the engine nacelle is in the raised orientation, to the second rotational orientation when the engine nacelle is in the lowered orientation.

7. The ram chute assembly of claim 2, wherein the tube includes a discharge portion, and wherein at least a portion of the tube defining the discharge portion resides on the wing upper surface when the tube is in the second rotational orientation.

8. The ram chute assembly of claim 6, wherein the bearing surface is a portion of the wing.

9. The ram chute assembly of claim 8 wherein the bearing surface is a leading edge of the wing.

* * * * *